United States Patent [19]
Takaiwa et al.

[11] Patent Number: 5,604,536
[45] Date of Patent: Feb. 18, 1997

[54] IMAGE MEMORY SYSTEM FOR STORING DIVIDED MULTIBIT DIGITAL IMAGES

[76] Inventors: Kan Takaiwa; Nobuhiro Takeda, both of c/o Canon Kabushiki Kaisha: (Tamagawa-Jiogyosho) 770, Shimonoge, Takatsu-ku, Kawasaki-shi, Kanagawa-ken, Japan

[21] Appl. No.: 180,791

[22] Filed: Jan. 10, 1994

Related U.S. Application Data

[63] Continuation of Ser. No. 908,914, Jul. 2, 1992, abandoned, which is a continuation of Ser. No. 490,452, Mar. 8, 1990, abandoned.

[30] Foreign Application Priority Data

Mar. 8, 1989 [JP] Japan ................ 1-055661

[51] Int. Cl.⁶ ............... H04N 5/30; H04N 5/225
[52] U.S. Cl. ............. 348/231; 348/222; 348/207; 348/714; 348/716
[58] Field of Search ................ 348/231, 232, 348/233, 222, 207, 714, 715, 716, 718, 719, 717; 358/906, 335, 524, 429, 261.2, 426, 455, 456, 466; 395/102, 106, 115; 362/176–178; H04N 5/30, 5/225, 5/76

[56] References Cited

U.S. PATENT DOCUMENTS

| | | | |
|---|---|---|---|
| 4,181,914 | 1/1980 | Inaba et al. | 348/718 |
| 4,467,355 | 8/1984 | Matsuda | 348/22 |
| 4,587,558 | 5/1986 | Sugiyama et al. | 348/718 |
| 4,614,966 | 9/1986 | Yunoki et al. | 348/282 |
| 4,631,598 | 12/1986 | Burkhardt et al. | 358/280 |
| 4,638,354 | 1/1987 | Denimal | 358/106 |
| 4,652,935 | 3/1987 | Endoh et al. | 358/429 |
| 4,758,883 | 7/1988 | Kawahara et al. | 358/44 |
| 4,780,761 | 10/1988 | Daly et al. | 358/133 |
| 4,802,005 | 1/1989 | Kondo | 358/135 |
| 4,803,554 | 2/1989 | Pape | 358/209 |
| 4,887,161 | 12/1989 | Watanabe et al. | 358/224 |
| 4,924,509 | 5/1990 | Yoromizo | 358/456 |
| 4,933,776 | 6/1990 | Ikeda | 358/456 |
| 5,034,804 | 7/1991 | Sasaki et al. | 358/41 |
| 5,057,924 | 10/1991 | Yamada et al. | 358/209 |

FOREIGN PATENT DOCUMENTS 56-126387 10/1981 Japan.

*Primary Examiner*—John K. Peng
*Assistant Examiner*—Nathan J. Flynn
*Attorney, Agent, or Firm*—Fitzpatrick, Cella, Harper & Scinto

[57] ABSTRACT

There is provided an image memory system of a solid-state camera in which a solid-state memory device which is divided into a plurality of memory areas is used as an image recording medium, wherein digital data of one pixel is supplied in parallel to the solid-state memory device and recorded into the individual memory areas in the solid-state memory device every bit, one of the memory areas is selected, and binary image data is written into the selected memory area. With the system, a variety of image data can be stored at a high speed in the serial copy mode or document mode without sacrificing the serial copy speed.

18 Claims, 6 Drawing Sheets ns 5,604,536

IMAGE MEMORY SYSTEM FOR STORING DIVIDED MULTIBIT DIGITAL IMAGES

This application is a continuation-in-part of application Ser. No. 07/908,914 filed Jul. 2, 1992, which is now abandoned, which is a continuation of application Ser. No. 07/490,452 filed Mar. 8, 1990, which is now abandoned.

BACKGROUND OF THE INVENTION

1. Field of the Invention

The present invention relates to an image memory system using a solid-state memory as a recording medium of an image signal.

2. Related Background Art

A solid-state camera using, for instance, a memory cartridge as an apparatus to record an image signal by using a solid-state memory is been known.

A construction to improve the serial copying speed in such a solid-state camera has been disclosed in JP-A-56-126387 (Kokai). FIG. 6 shows a block diagram of the construction of a system similar to the system disclosed in the above Official Gazette.

In FIG. 6, reference numeral 10 denotes a photographing lens; 12 indicates a solid-state image pickup unit; 14 an analog image processing circuit; 16 an A/D converter; 18 a latch circuit; 20a, 20b, 20c, 20d, 20e, 20f, 20g, and 20h parallel/serial (P/S) converters each for converting a 8-bit parallel signal into a serial signal; 22 a memory cartridge having eight memory packs 22a, 22b, 22c, 22d, 22e, 22f, 22g, and 22h comprising semiconductor memories as memory devices; and 23 a clock circuit.

The image pickup unit 12 converts an image of an object which was photographed by the photographing lens 10 into an electric signal. The analog image processing circuit 14 executes well-known analog image processes to an output of the image pickup unit 12. The A/D converter 16 converts a signal of one pixel of an output of the analog image processing circuit 14 into an 8-bit digital signal. The 8-bit data is latched into the latch circuit 18 and is sequentially supplied every pixel to the P/S converters 20a to 20h. In this case, the latch circuit 18 comprises 8 bits×8 latch elements and circulatively supplies the pixel data to the P/S converters 20a to 20h every pixel in a manner such that the first pixel data is supplied to the P/S converter 20a, the second pixel data is supplied to the P/S converter 20b, and the like.

The P/S converters 20a to 20h convert the 8-bit parallel signals into the serial signals. The serial outputs are stored into the corresponding memory packs 22a to 22h, respectively.

With the above construction, as compared with the case where all of the pixel data are stored into one memory pack, they can be recorded in the time of ⅛ of that in the above case and the recording time can be reduced. In other words, the serial copy speed can be raised. Generally, if N memory packs and N P/S converters are provided and the latch circuit 18 is constructed by 8 bits×N latch elements, the recording time can be reduced into 1/N.

However, in the above conventional example, since one image is distributed and stored into a plurality of memory packs 22a to 22h in the memory cartridge 22, there is a drawback such that if all of the memory packs are not provided, the recorded image cannot be reproduced. On the other hand, there is a problem such that in order to reduce the recording time, many P/S converters and many latch elements are needed and the circuit is complicated.

SUMMARY OF THE INVENTION

In consideration of the above problems, it is an object of the present invention to provide an image memory system in which a recording speed is improved.

Another object of the invention is to provide an image memory system which can store a variety of image data.

Still another object of the invention is to provide an image memory system which can efficiently use a memory capacity of image data.

Under the above objects, according to one preferred embodiment of the present invention, there is provided an image memory system as a solid-state camera in which a solid-state memory device which is divided into a plurality of memory areas is used as an image recording medium, wherein digital data of one pixel is supplied in parallel to the solid-state memory device and recorded into the individual memory areas in the solid-state memory device every bit and one of the memory areas is selected and binary image data can be written into the selected memory area.

Further another object of the invention is to provide an image memory system suitable for use in a non-volatile memory.

Further another object of the invention is to provide a novel image pickup system comprising an image pickup device and an image memory system.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will be described hereinbelow with reference to the drawings.

Figure 1:
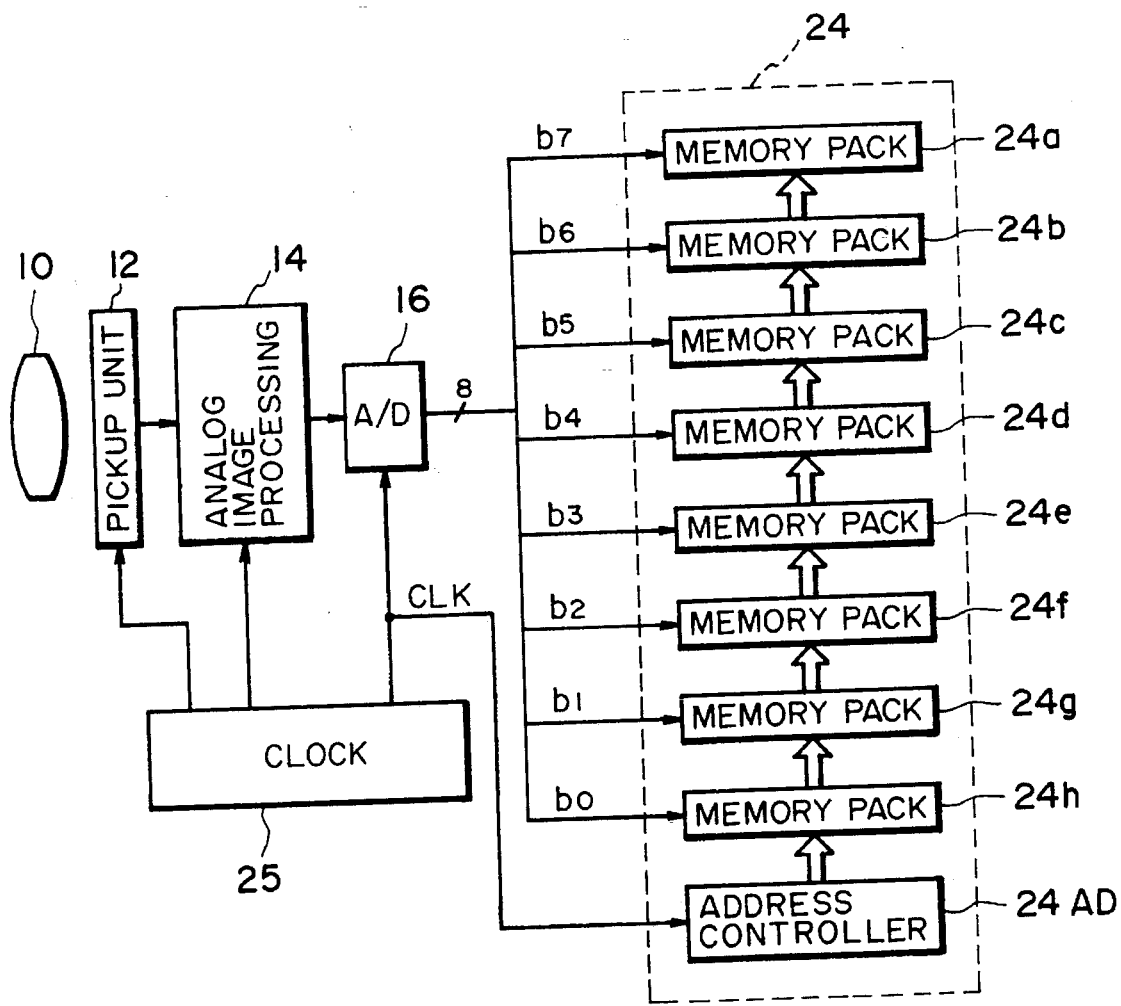
FIG. 1 is a constructional block diagram of the first embodiment of the present invention.
Figure 6:
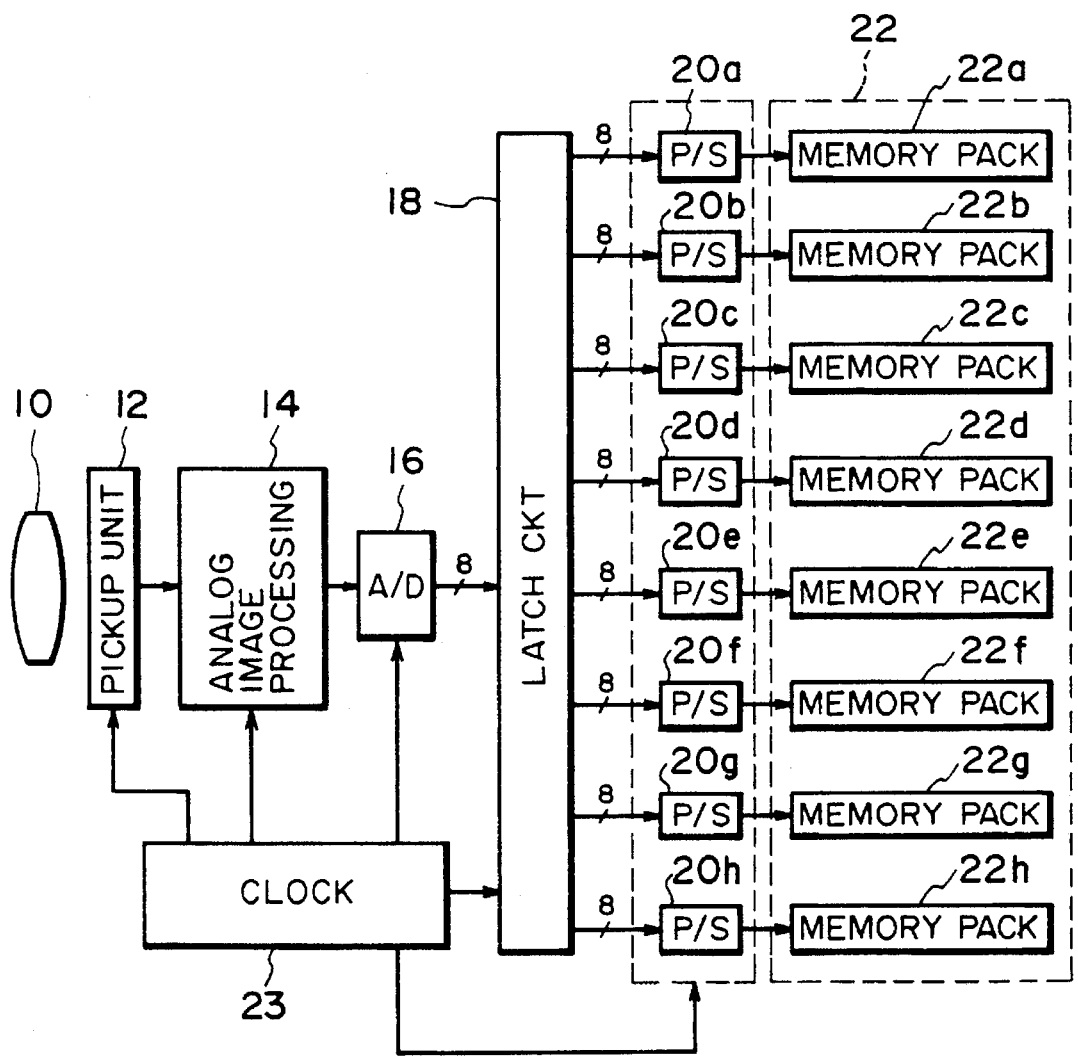
FIG. 6 is a diagram showing a system of a related art.

FIG. 1 is a constructional block diagram of an embodiment of the invention, in which the same parts and components as those shown in FIG. 6 are designated by the same reference numerals. Reference numeral 24 denotes a memory cartridge having eight memory packs 24a, 24b, 24c, 24d, 24e, 24f, 24g, and 24h corresponding to 8-bit outputs $b_7$ to $b_0$ of the A/D converter 16. The memory cartridge 24 can be attached to and detached from the main body of the system. That is, among the 8-bit outputs $b_7$ to $b_0$ of the A/D converter 16, the bit $b_7$ is input to the memory pack 24a; the bit $b_6$ to the memory pack 24b; the bit $b_5$ to the memory pack 24c; the bit $b_4$ to the memory pack 24d; the bit $b_3$ to the memory pack 24e; the bit $b_2$ to the memory pack 24f; the bit $b_1$ to the memory pack 24g; and the bit $b_0$ to the memory pack 24h. Reference numeral 24AD denotes an address controller for counting pixel clocks which are input and generating address data to the memory packs 24a to 24h. Reference numeral 25 indicates a clock generator to generate clocks to specify the operation timings of the image pickup unit 12, analog image processing circuit 14, and A/D converter 16.

In the embodiment, the 8-bit image data which was A/D converted by the A/D-converter 16 has directly been written into the memory cartridge 24. However, the A/D converted data is digitally compressed by, for instance, the DPCM or the like and, thereafter, the compressed data can be also written into the memory cartridge 24.

Although the address controller is not shown in each of FIGS. 2 and 3, which will be explained herein-later, and in FIG. 6, it is included in the memory cartridge.

The object image by the photographing lens 10 is converted into the electric signal by the image pickup unit 12 in a manner similar to the conventional example. The electric signal is processed by the analog image processing circuit 14 and converted into the 8-bit digital data by the A/D converter 16. The output data of the A/D converter 16 is stored into the memory packs 24a to 24h in the memory cartridge 24 every bit, respectively. Only the writing time of one bit is needed to record one pixel data into the memory cartridge 24. Therefore, the recording time is reduced into ⅛ as compared with the case of recording one pixel data into one memory pack.

In FIG. 1, eight memory packs 22a to 22h are provided in the memory cartridge 24 in accordance with the number of output bits of the A/D converter 16. Other combination can be also used if the number of memory packs and the number of output bits of the A/D converter 16 are equal.

Figure 2:
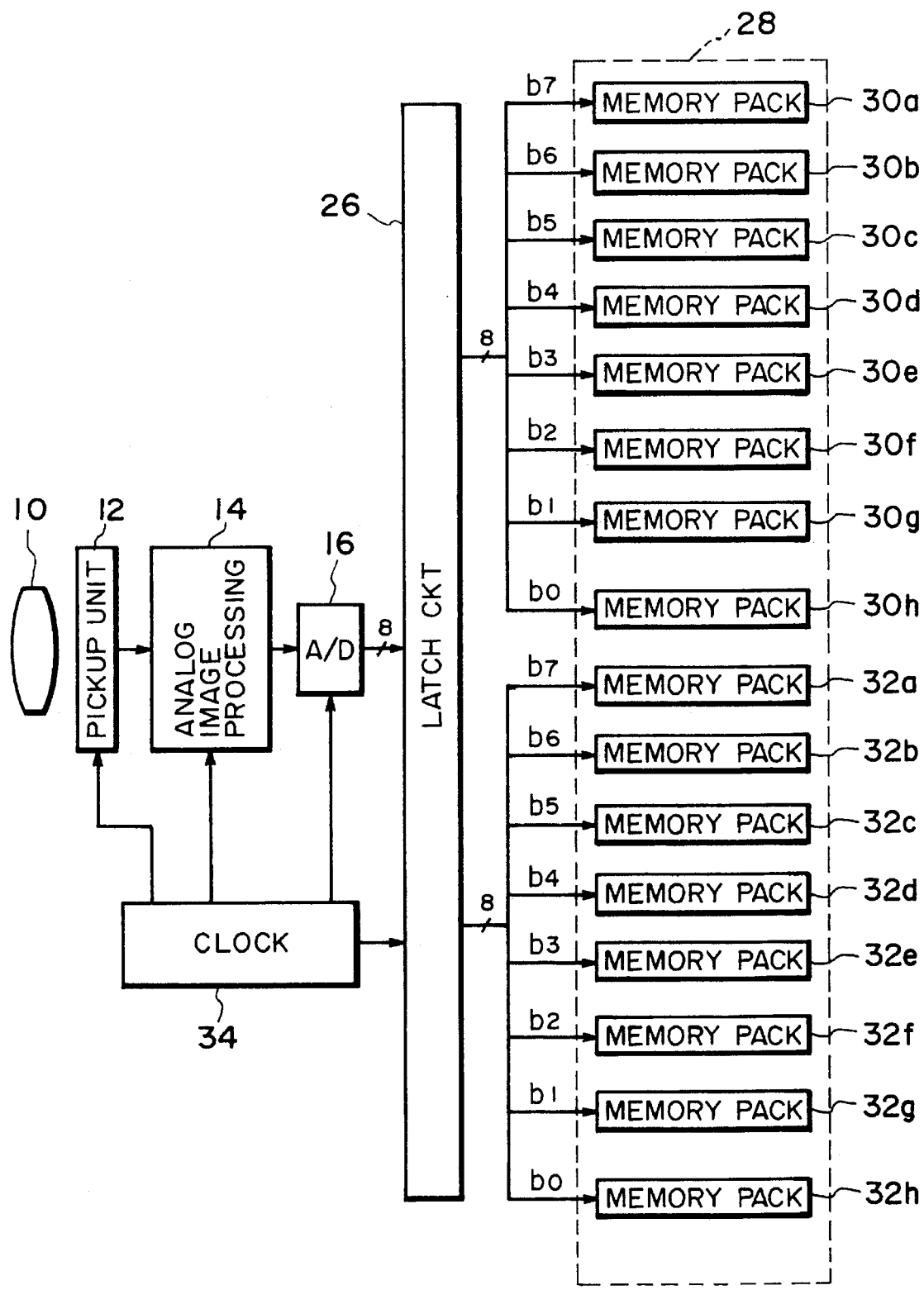
FIG. 2 is a constructional block diagram of another embodiment of the invention.

FIG. 2 shows a constructional block diagram of another embodiment of the invention. Reference numeral 26 denotes a latch circuit comprising 8 bits×two latch elements; 28 indicates a memory cartridge having sixteen memory packs 30a to 30h and 32a to 32h; and 34 a clock generator to generate clocks to specify the operation timings of the image pickup unit 12, analog image processing circuit 14, A/D converter 16, and latch circuit 26.

In a manner similar to the memory packs 22a to 22h in the embodiment of FIG. 1, the bits of one 8-bit pixel data are simultaneously recorded into the memory packs 30a to 30h. On the other hand, the bits $b_7$ to $b_0$ of one 8-bit pixel data are also simultaneously recorded into the memory packs 32a to 32h in a manner similar to the above. In the latch circuit 26, the 8-bit output of the A/D converter 16 is alternately distributed into the memory packs 30a to 30h and memory packs 32a to 32h every pixel. That is, when the first pixel signal is digitized by the A/D converter 16, the 8-bit data is latched into the latch circuit 26 and recorded into the memory packs 30a to 30h every bit in a manner similar to the case of FIG. 1. At the next pixel, the latch circuit 26 latches the output data of the A/D converter 16 and supplies to the memory packs 32a to 32h. Thus, the data of the second pixel is recorded into the memory packs 32a to 32h.

As mentioned above, by alternately using the memory packs 30a to 30h and the memory packs 32a to 32h every pixel, the recording time can be reduced into ¹⁄₁₆ as compared with the case of recording into only one memory pack.

The case of the embodiment of FIG. 2 will now be standardized. When the number of output bits of the A/D converter 16 is set to n, assuming that the number of latch elements of the latch circuit 26 is set to n×m, the recording time can be reduced into $1/(n \times m)$ by using n×m memory packs as compared with that in the case of one memory pack. n and m are positive integers.

As will be easily understood from the above description, according to the embodiment, the recording time can be remarkably reduced without making the circuit complicated, so that a high serial copy speed can be realized.

The second embodiment of the invention will now be described.

In the second embodiment, there is shown a system as a whole solid-state camera system in which a semiconductor memory device which is divided into a plurality of memory areas is used as an image recording medium, wherein when an ordinary natural image is recorded, the digital data of one pixel is supplied in parallel to the semiconductor memory device and is recorded into different memory areas in the semiconductor memory device every bit, while in the case of recording a document image, the image signal is binarized and, thereafter, it is recorded into different memory areas in the semiconductor memory device every image.

In the above system, the recording time into semiconductor memory device can be reduced into the time corresponding to a fraction of the number of bits as compared with that in the case where one image data is serially recorded into one memory area. Thus, the serial copy speed can be further raised.

On the other hand, since a document image is binarized and recorded as one-bit data, it can be recorded into the memory areas corresponding to a fraction of the number of bits in the case of recording a natural image. Thus, the storing efficiency can be improved.

Further, since a circuit construction is also simple, the circuit is not complicated.

Figure 3:
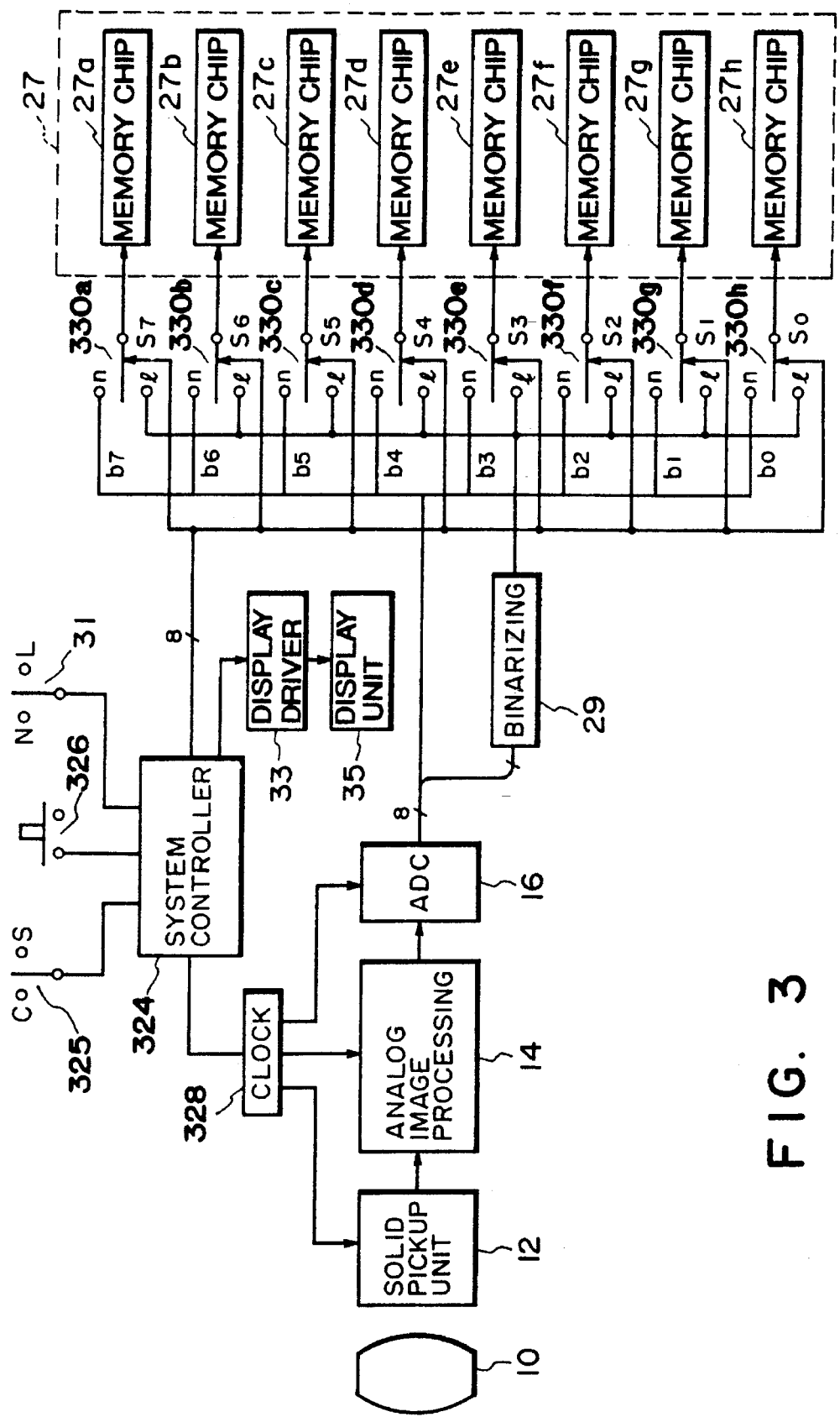
FIG. 3 is a block diagram showing a construction of the second embodiment of the invention.

FIG. 3 is a constructional block diagram of another embodiment of the invention, in which the same parts and components as those shown in FIG. 2 are designated by the same reference numerals and their descriptions are omitted. Reference numeral 324 denotes a system controller to control the operation of the whole system; 27 indicates a memory cartridge having eight memory chips 27a, 27b, 27c, 27d, 27e, 27f, 27g, and 27h in correspondence to the 8-bit outputs $b_7$ to $b_0$ of the A/D converter 16; 328 clock generator to generate clock pulses to specify the operation timings of the image pickup unit 12, analog image processing circuit 14, and A/D converter 16; 29 a binarizing circuit for binarizing the 8-bit output of the A/D converter 16 into the one-bit data; 330a, 330b, 330c, 330d, 330e, 330f, 330g, and 330h change-over switches for switching the data from the A/D converter 16 and the data from the binarizing circuit 29 in accordance with a switching signal from the system controller 324; and 31 an image mode change-over switch to switch between the natural image mode and the document mode.

When a release switch 326 is depressed and closed, the system controller 324 starts the photographing sequence and activates the clock circuit 328. The clock circuit 23 supplies drive pulses to the solid-state image pickup unit 12 and the like. An object image by the photographing lens 10 is converted into an electric signal by the image pickup unit 12. The electric signal is processed by the analog image processing circuit 14 and is converted into the 8-bit digital data by the A/D converter 16. The binarizing circuit 29 binarizes the output data of the A/D converter 16 in accordance with a predetermined procedure and converts into the one-bit data.

In the case of recording a natural image, that is, in the case where the image mode change-over switch 31 is switched to the natural image N side (natural image mode), the change-over switches 330a to 330h are switched to the n side by switching signals $s_7$ to $s_0$ from the system controller 324 and the output data of the A/D converter 16 is stored into the corresponding memory chips 27a to 27h in the memory cartridge 27 every bit. Since it takes the writing time of one bit to write one pixel data into the memory cartridge 27, the recording time is reduced into 1/8 as compared with that in the case of recording one pixel data into one memory chip.

On the other hand, in the case of recording a document image, that is, in the case where the image mode change-over switch 31 is switched to the document image L side (document mode), either one of the change-over switches 30a to 30h is switched to the Z side by the switching signals $s_7$ to $s_0$ from the system controller 24, so that the output data of the binarizing circuit 29 is stored into either one of the memory chips 27a to 27h in the memory cartridge 27.

If the release switch 326 is still held in the closed state upon completion of the above photographing sequence, the system controller 324 checks the state of the serial copy mode change-over switch 325. When the switch 325 is closed to the serial copy C side, the system controller subsequently activates the new photographing sequence. When switch 325 is switched to the single copy S side, the photographing operation is finished.

The operation in the case of recording the document image will now be described further in detail. In the embodiment, the number of natural images and the number of document images which have been recorded until now are stored in the system controller 324. Upon recording of a document image, either one of the change-over switches 330a to 330h which should be switched to the l side and either one of the memory chips 27a to 27h into which the document image data should be recorded are determined in the following manner.

That is, assuming that the number of document images which have already been recorded until now is set to l, in the following equation ①, $$m=(l-1) \bmod 8 \ldots \quad ①$$

the change-over switch 330a when m=0, the switch 330b when m=1, the switch 330c when m=2, the switch when m=3, the switch 330e when m=4, the switch 330f when m=5, the switch 330g when m=6, or the switch 330h when m=7 is switched to the l side, thereby recording the document image data into either one of the corresponding memory chips 27a to 27h, respectively. In the equation ①, mod denotes an operator to obtain the remainder. In the natural image mode, all of the change-over switches 330a to 330h are switched to the n side.

Determination will be made as follows with respect to the image data should be recorded into the memory area corresponding to which number of image.

That is, assuming that the number of natural images which have already been recorded until now is set to n, in the natural image mode, it is sufficient to record the new image data into the pth memory area on the basis of the equation ②.

$$p=(l+7)/8+n \ldots \quad ②$$

On the other hand, in the document mode, the new image data is recorded into the (p-1)th memory area. In the equation ②, / denotes an operator to execute the integer division.

In FIG. 3, the eight memory chips 27a to 27h are provided in the memory cartridge 27 in accordance with the number of output bits of the A/D converter 16. Other combination can be also used if the number of memory chips and the number of output bits of the A/D converter are equal.

On the other hand, a display driver 33 is controlled so as to display a remaining amount to an external display unit 35 so that a photographer can confirm the remaining amount of the memory, that is, the number of remaining images which can be photographed after that. In such a case, the following processes are executed.

That is, assuming that the number of all of the images which can be recorded into the memory cartridge 27 is set to t and the remaining amount of the memory is set to s, in the natural image mode., the value of s based on the following equation is displayed as a remaining amount.

$$s=t-p+1$$

On the other hand, in the document mode, the value of s based on the following equation is displayed as a remaining amount, for instance, by a numerical value.

$$s=(t-n)*8l$$

Figure 4:
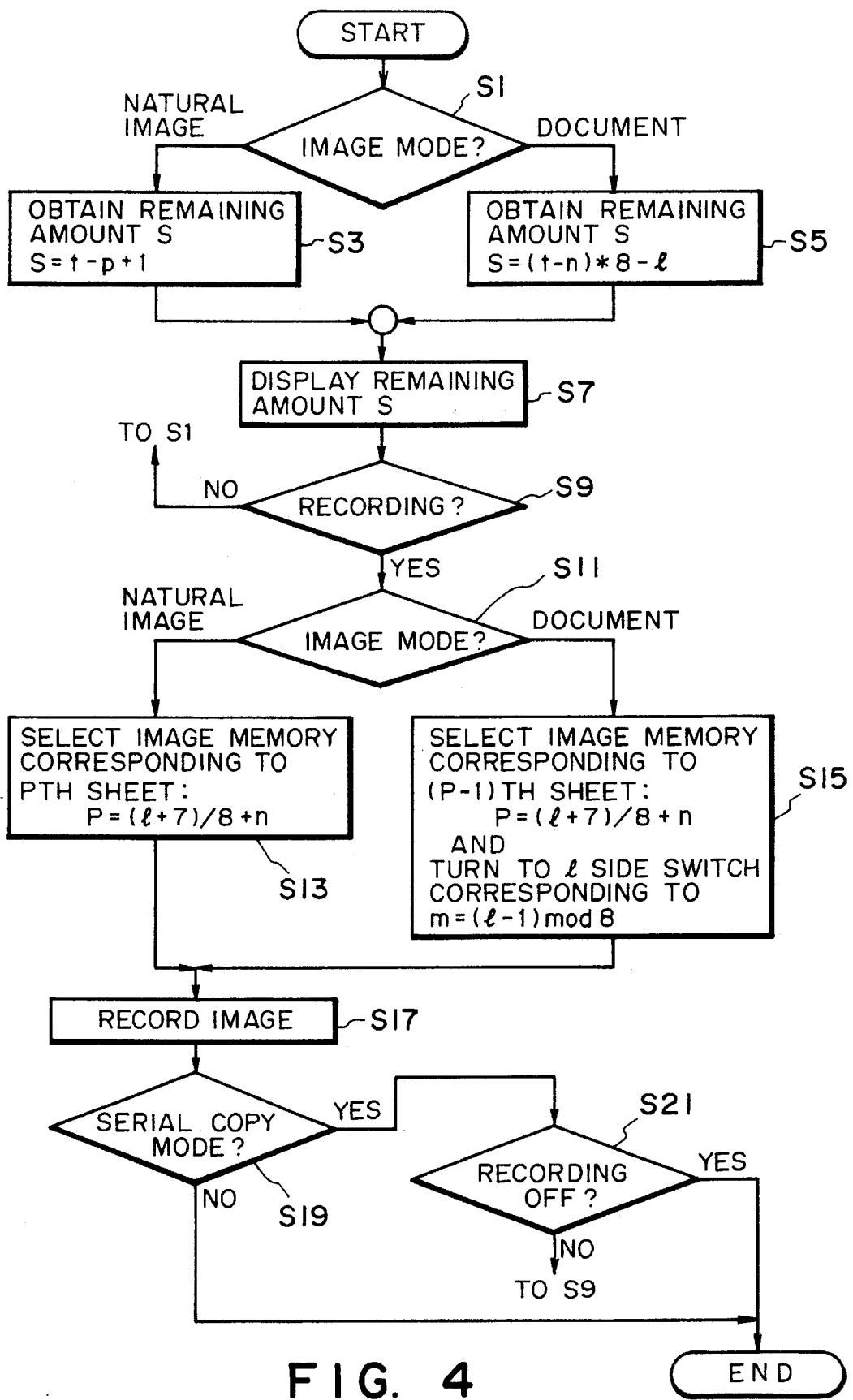
FIG. 4 is a flowchart showing the operation of the embodiment shown in FIG. 3.

The operation of the above embodiment will now be described with reference to FIG. 4. In FIG. 4, when a power source (not shown) of the system is turned on, a check is made in step S1 to see if the switch 31 has been switched to the natural image mode or the document mode. If the natural image mode has been set, step S3 follows. If the document mode has been set, step S5 follows. The calculations shown in the diagrams as mentioned above are executed and the remaining amount s is displayed on the display unit 35 in step S7.

When the release switch 326 to record has been turned on in the above state, the processing routine advances from step S9 to step S11 and a check is again made to see if the switch 31 has been switched to the natural image mode or the document mode.

In the natural image mode, step S13 follows. In the document mode, step S15 follows. In step S13 or S15, as shown in the diagram, the Pth image memory is selected. In the natural image mode, all of the switches 330a to 330h are switched to the n side and the image data is written into the memory chips 27a to 27h, while in the document mode, among the switches 330a to 330h, the switch corresponding to m=(l-1) mod 8 is switched to the l side and the image data is written into either corresponding one of the memory chips 27a to 27h in step S17. If the serial copy mode has been set in step S19, the processing routine advances to step S21 and the above-mentioned processes are repeated until the recording is set to off.

As will be easily understood from the above description, according to the embodiment, the recording time can be fairly reduced without making the circuit complicated and the high serial copy speed can be realized. Upon recording of a document image, only the memory area of 1/8 of that in the case of recording a natural image is occupied, so that the storing efficiency can be improved.

Figure 5:
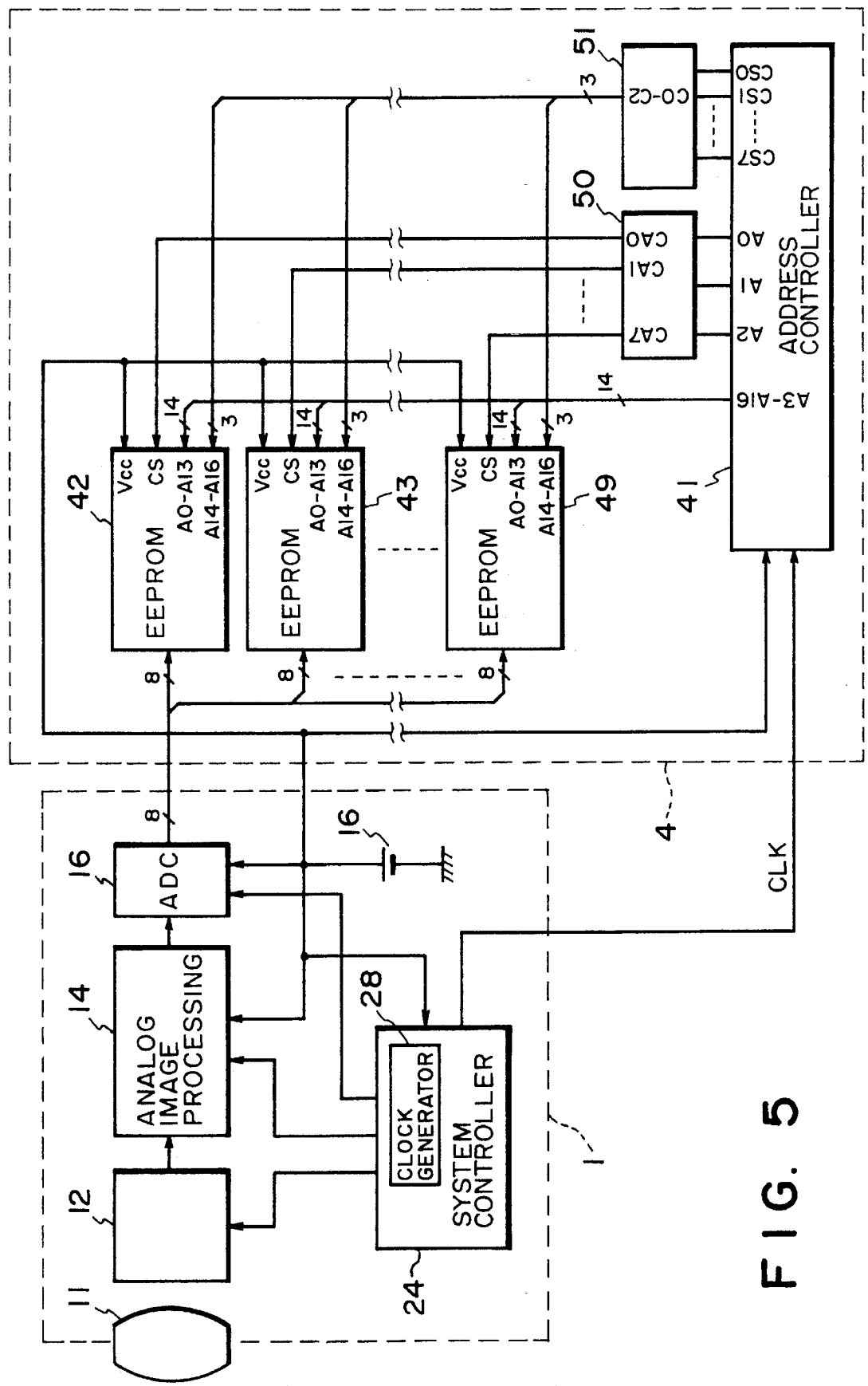
FIG. 5 is a block diagram showing a construction of the third embodiment of the invention.

In the above embodiment, the data of a plurality of bits of each pixel has been stored into the individual memory areas. With reference to FIG. 5, explanation will now be made with respect to an embodiment in which data of a plurality of bits of each pixel is written into different EEPROMs every pixel.

In the following embodiment, there is shown a system in which a memory cartridge using EEPROM chips is used as an image recording medium and continuous image data is switched and recorded so as to be assigned to the different EEPROM chips in the memory cartridge, so that a whole solid-state camera system which doesn't need a backup battery can be constructed without sacrificing the serial copy speed.

FIG. 5 is a block diagram showing a construction of the third embodiment of the invention, in which the same parts and components as those shown in FIG. 2 are designated by the same reference numerals and their descriptions are omitted. Reference numeral 4 denotes a memory cartridge in the embodiment; 41 indicates an address controller; 42 to 49 EEPROM chips; 50 an address decoder; and 51 a chip encoder.

The operation of the embodiment shown in FIG. 5 will now be described. Image data of eight bits is output together with a clock signal CLK from the solid-state camera main body 1. The address controller 41 outputs an address signal ADR and chip selection signals $CS_0$ to $CS_7$ in accordance with the input clock signal CLK. In the embodiment, lower three bits $A_0$ to $A_2$ in the address signal ADR which is output from the address controller 41 are input to the address decoder 50. The address decoder 50 outputs chip selection signals $CA_0$ to $CA_7$ in accordance with the input address signals. On the other hand, the chip selection signals $CS_0$ to $CS_7$ which are output from the address controller 41 are input to the chip encoder 51. The chip encoder 51 outputs address signals $C_0$ to $C_2$ in accordance with the input chip selection signals. The chip selection signals $CA_0$ to $CA_7$ which were output from the address decoder 50 are respectively connected to chip selecting terminals CS of the EEPROM chips 42 to 49. In the address signal which was output from the address controller 41, the upper fourteen bits $A_3$ to $A_{16}$ are connected to the lower fourteen bits $A_0$ to $A_{13}$ of address terminals of the EEPROM chips 42 to 49, respectively. On the other hand, the address signals $C_0$ to $C_2$ which were output from the chip encoder 51 are connected to upper three bits $A_{14}$ to $A_{16}$ of the address terminals of the EEPROM chips 42 to 49, respectively.

With the above construction, in the embodiment, the image data is written into different memory chips every pixel and the data is written into the adjacent memory cells every eight pixels. It is possible to construct a whole solid-state camera system having a memory unit which is detachable from the camera main body by using the EEPROM chips of a long write access time without sacrificing the serial copy speed and without using a backup battery for holding the image data.

Although the embodiment has been described with respect to the case of sequentially writing the image data into eight EEPROM chips, the number of EEPROM chips is not limited to eight but the present invention can be also obviously applied to other construction using an arbitrary number of EEPROM chips. On the other hand, although the embodiment has been described with respect to the case of using the EEPROM chips of a construction comprising 8 bits×128 kbytes, any other EEPROM chips of a different construction can be also used.

As will be obvious from the above description, according to the embodiment, a whole solid-state camera system can be constructed without sacrificing the serial copy speed by using EEPROM chips of a long write access time in place of an unnecessary backup battery. There is no need to be aware of the power consumption of the backup battery or the like. Thus, a whole solid-state camera system having a high operability and a high using efficiency can be realized.

The EEPROM chips shown in the embodiment can be also replaced to the memory cartridges 24 and 27 shown in FIGS. 1 and 3. The kind of memory is not limited to such a type.

In the above case, even if the data writing speed is slow, the data can be written into the memory at a high speed. Further, a variety of data in the document mode and the natural image mode can be efficiently written into the memory.

In the embodiment, image data has been compressed by binarizing the multi-bit image data. However, the invention is not limited to such a binarizing method but any other compressing method such as DPCM, block encoding, or the like can be also used.

We claim:

1. A camera comprising:

photoelectric converting means for converting an object image into an electric signal;

A/D converting means for converting the electric signal into multibit digital image data for each of a plurality of pixels of an image block;

dividing means for dividing the multibit digital image data for each pixel of the image block into a respective plurality of single-bit data;

processing means for converting the multibit digital image data for each pixel of the image block into a respective single-bit digital image data;

a plurality of memories for storing multibit digital image data and single-bit digital image data;

determining means for performing a calculation based on image data previously stored in said plurality of memories to provide a calculated result and for determining one of said plurality of memories into which to store the single-bit digital image data for all pixels of the image block based on the calculated result; and mode changing means for changing recording modes between a plurality of recording modes, said plurality of recording modes including a first mode in which each of said plurality of memories stores, in parallel, respective ones of the single-bit data of the multibit data divided by said dividing means and a second mode in which the single-bit digital image data for all pixels of the image block are stored in sequence in the one memory determined by said determining means.

2. A camera according to claim 1, wherein said mode changing means includes selecting means for selecting the one memory.

3. A camera according to claim 1, wherein each of said plurality of memories has equal capacity.

4. A camera according to claim 1, wherein said memories are EEPROMs.

5. A camera according to claim 1, further comprising an address counter which is commonly provided for said plurality of memories.

6. A camera according to claim 1, wherein said plurality of memories are detachably constructed to said camera.

7. An image data processing apparatus, comprising:

supplying means for supplying multibit digital image data for a plurality of pixels;

processing means for converting the multibit digital image data for each pixel to a respective single-bit digital image data;

memory means, having a plurality of memory areas, for storing multibit digital image data and single-bit digital image data;

determining means for determining one of said memory areas into which to store the single-bit digital image data for all the pixels; and control means for controlling a writing operation into said memory means, wherein said control means controls the writing operation so that individual bits of the multibit digital image data for each pixel are stored in parallel in respective ones of said memory areas, and the single-bit digital image data for all the pixels is stored in sequence in the one memory area determined by said determining means.

8. An apparatus according to claim 7, wherein said control means includes selecting means for selectively outputting the multibit digital image data or the single-bit digital image data to said memory means.

9. An apparatus according to claim 8 wherein said supplying means includes photoelectric converting means for converting an object image to an electric signal and A/D converting means for converting the electric signal from said photoelectric converting means to the multibit digital image data.

10. An apparatus according to claim 9, wherein said selecting means outputs the multibit digital image data when the object image is a natural image and outputs the single-bit digital image data when the object image is a document image.

11. An apparatus according to claim 7, wherein said supplying means includes dividing means for dividing the multibit digital image data to the individual bits and said memory means includes a plurality of memories.

12. An apparatus according to claim 11, wherein said controls means controls said memory means so that the individual bits are stored into respective ones of the plurality of memories when said memory means stores the multibit digital image data and so that the single-bit digital image data is stored into one of the plurality of memories when said memory means stores the single-bit digital image data.

13. An apparatus according to claim 7, further comprising clock supplying means for supplying an operation clock to said supplying means, said processing means and said memory means.

14. An image data processing apparatus, comprising:

supplying means for supplying a plurality of single-bit data divided from current multibit digital image data for one pixel, said supplying means further supplying a single-bit digital image data for one pixel;

a plurality of memories for storing single-bit data divided from multibit digital image data and single-bit digital image data;

selecting means for selectively outputting the plurality of single-bit data divided from the current multibit digital image data or the single-bit digital image data to said plurality of memories;

determining means for determining one of said plurality of memories in which to store the single-bit data; and control means for controlling said plurality of memories so that, when said selecting means outputs the single-bit data divided from the current multibit digital image data, the output single-bit data are stored in parallel in respective ones of said plurality of memories and, when said selecting means outputs the single-bit digital image data, the output single-bit digital image data is stored in the one memory determined by said determining means.

15. An apparatus according to claim 14, wherein said supplying means includes photoelectric converting means for converting an object image to an electric signal, A/D converting means for converting the electric signal from said photoelectric converting means to the multibit digital image data and processing means for converting the multibit digital image data to the single-bit digital image data.

16. An apparatus according to claim 15, wherein said control means controls a selection of said selecting means so that selecting means outputs the single-bit data divided from the current multibit digital image data when the object image is a natural image and so that selecting means outputs the single-bit digital image data when the object image is a document image.

17. An apparatus according to claim 14, further comprising clock supplying means for supplying an operation clock to said supplying means and said memory means.

18. An apparatus according to claim 14, wherein said supplying means includes a video camera which outputs the natural image data and the document image data.

* * * * *